(12) United States Patent
Fang et al.

(10) Patent No.: US 11,172,246 B1
(45) Date of Patent: Nov. 9, 2021

(54) BITRATE ADAPTATION FOR LOW LATENCY STREAMING

(71) Applicant: VisualOn, Inc., San Jose, CA (US)

(72) Inventors: Mei Fang, Shanghai (CN); Yisheng Yao, Shanghai (CN); Xuejun Dong, Shanghai (CN); Huan-Chih Tsai, San Jose, CA (US)

(73) Assignee: VisualOn, Inc., Campbell, CA (US)

( * ) Notice: Subject to any disclaimer, the term of this patent is extended or adjusted under 35 U.S.C. 154(b) by 0 days.

(21) Appl. No.: 16/857,546

(22) Filed: Apr. 24, 2020

(51) Int. Cl.
*H04N 21/2662* (2011.01)
*H04N 21/24* (2011.01)
*H04N 21/234* (2011.01)
*H04L 29/06* (2006.01)

(52) U.S. Cl.
CPC ....... *H04N 21/2662* (2013.01); *H04L 65/601* (2013.01); *H04N 21/23406* (2013.01); *H04N 21/24* (2013.01)

(58) Field of Classification Search
CPC ............... H04N 21/2662; H04N 21/24; H04N 21/23406; H04N 21/23439; H04N 21/44218; H04N 21/64784; H04N 21/8547; H04N 19/115; H04N 7/15; H04L 65/601; H04L 65/4076; H04L 65/605; A63F 13/355; G11B 27/005
See application file for complete search history.

(56) References Cited

U.S. PATENT DOCUMENTS

| | | | |
|---|---|---|---|
| 2011/0302238 A1* | 12/2011 | Sood ................... | G11B 27/005 709/203 |
| 2014/0111604 A1* | 4/2014 | Vonog ..................... | H04N 7/15 348/14.12 |
| 2019/0230142 A1* | 7/2019 | He ................... | H04N 21/44218 |
| 2019/0282897 A1* | 9/2019 | Posin ................... | A63F 13/355 |
| 2020/0021892 A1* | 1/2020 | April .................. | H04L 65/4076 |
| 2020/0099733 A1* | 3/2020 | Chu ..................... | H04L 65/605 |
| 2020/0162773 A1* | 5/2020 | Hess .................. | H04N 21/8547 |
| 2020/0162796 A1* | 5/2020 | Azuolas ........... | H04N 21/23439 |
| 2020/0275171 A1* | 8/2020 | Cloud .............. | H04N 21/64784 |
| 2020/0351504 A1* | 11/2020 | Sen ..................... | H04N 19/115 |

OTHER PUBLICATIONS

DASH Industry Forum. "Guidelines for Implementation: DASH-IF Interoperability Points, Version 4.3." DASH Interoperability Forum. Nov. 15, 2018.
I MPEG "Information technology-dynamic adaptive streaming over http (dash)—part 1: media presentation description and segment formats". ISO. IEC MPEG, Tech. Fourth Edition, Dec. 2019.
Spiteri et al. "BOLA: Near-optimal bitrate adaptation for online videos." IEEE INFOCOM 2016—The 35th Annual IEEE International Conference on Computer Communications. IEEE, 2016.

(Continued)

*Primary Examiner* — Le H Luu
(74) *Attorney, Agent, or Firm* — Van Pelt, Yi & James LLP

(57) ABSTRACT

A system for bitrate adaptation for low latency streaming includes an interface and a processor. The interface is configured to receive statistics, wherein the statistics comprise a server latency and a buffer level. The processor is configured to perform a set of checks based at least in part on the statistics, determine a streaming bitrate based at least in part on the set of checks, and indicate the streaming bitrate.

21 Claims, 19 Drawing Sheets

(56) References Cited

OTHER PUBLICATIONS

Spiteri et al. "From theory to practice: Improving bitrate adaptation in the DASH reference player." MMSys'18, Jun. 12-15, 2018, Amsterdam, Netherlands.

Unknown "Information technology—Multimedia application format (MPEG-A)—Part 19: Common media application format (CMAF) for segmented media." ISO/IEC, First Edition Jan. 2018.

\* cited by examiner

BITRATE ADAPTATION FOR LOW LATENCY STREAMING

BACKGROUND OF THE INVENTION

A streaming video provider provides a stream of video data for display on a video playback device. Typically video data is recorded by a video recording device, provided to a video streaming server system, streamed via a network to a video streaming client system, and played back on a video playback device. Video playback latency is measured as the total time from when a video streaming client system provides a data request to the video streaming server system to when the video streaming client system begins receiving data from the video streaming server system. In most traditional applications (e.g., movie streaming) latency is not a primary concern, so long as it is sufficiently low to provide an acceptable user experience (e.g., it doesn't take too long from when the user pushes the play button to when the video starts playing). As video streaming is used for a wider set of applications, use cases arise where low latency is key. For example, when live streaming video within a sports arena, minimizing latency is crucial to providing a quality experience, as viewers can see both the live action and the video display. Typically high video quality is achieved by increasing an amount of buffered video data, allowing for robustness under variable network conditions. The amount of buffered video corresponds to an amount of latency, however, creating a situation where high quality video streaming is desired with a minimum of buffered video data.

BRIEF DESCRIPTION OF THE DRAWINGS

Various embodiments of the invention are disclosed in the following detailed description and the accompanying drawings.

DETAILED DESCRIPTION

Figure 1:
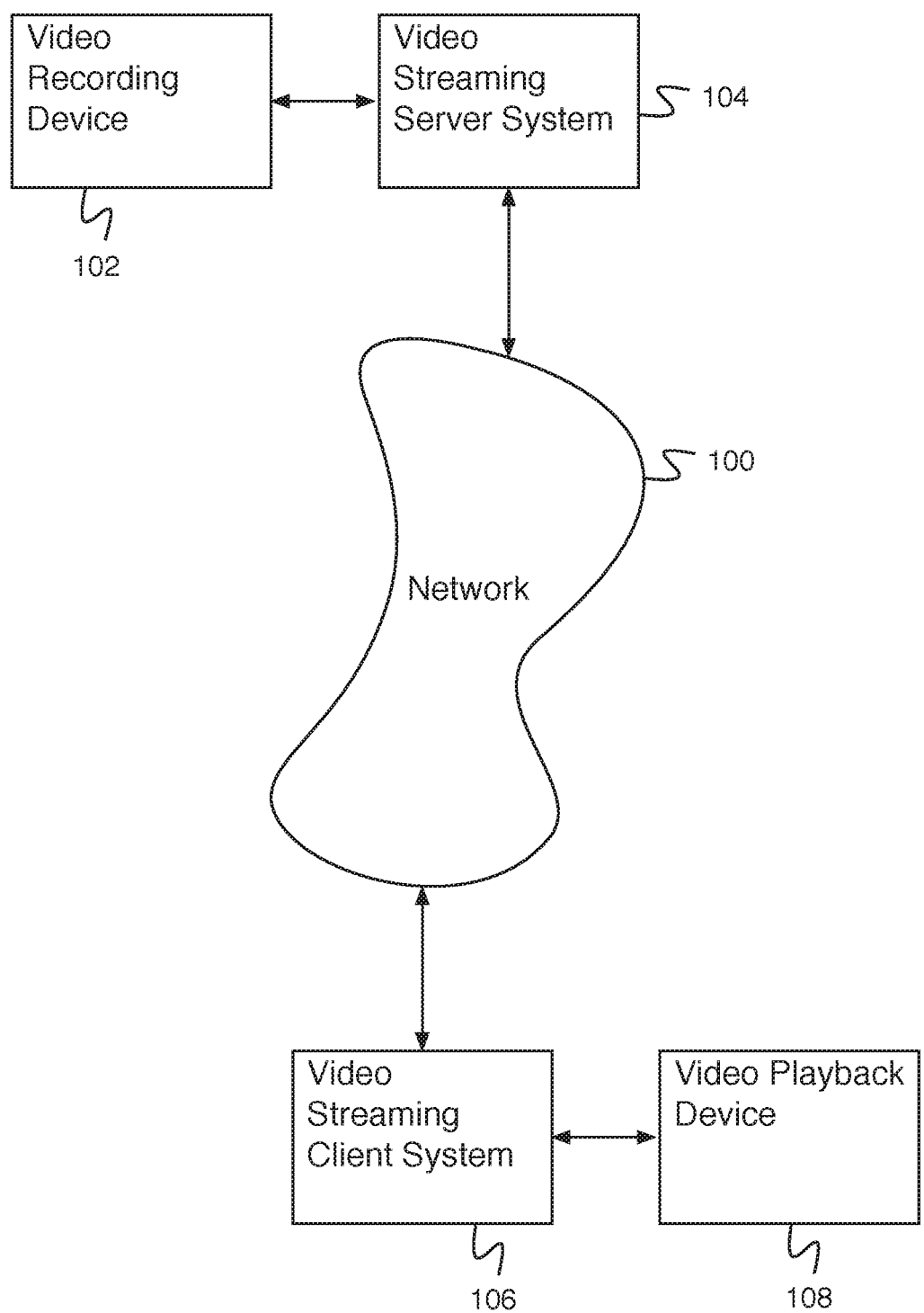
FIG. 1 is a block diagram illustrating an embodiment of a network system for a system for multiple view streaming.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for bitrate adaptation for low latency streaming is disclosed. The system comprises an interface and a processor. The interface is configured to receive statistics, wherein the statistics comprise a server latency and a buffer level. The processor is configured to perform a set of checks based at least in part on the statistics, determine a streaming bitrate based at least in part on the set of checks, and indicate the streaming bitrate. In some embodiments, the system additionally comprises a memory coupled to the processor and configured to provide the processor with instructions.

A system for bitrate adaptation for low latency streaming comprises a system for a video streaming client system for determining a streaming bitrate. The system for bitrate adaptation receives a set of statistics and makes a bitrate determination based at least in part on the set of statistics. For example, the system for bitrate adaptation receives statistics from a video streaming server system or the system for bitrate adaptation determines statistics based at least in part on system data. For example, statistics comprise: a server latency (e.g., the duration between sending a request from the client and receiving the first byte of a response from the server); a live latency (e.g., the difference between the current playing position and the current universal time coordinate (e.g., UTC) time); a target latency (e.g., a desired value for live latency); a buffer level (e.g., the time duration of video data in the video player buffer); n buffer level (e.g., the average of the last five measurements of buffer level); an efficiency (e.g., 1 minus the ratio of segment download time to segment duration); an average efficiency (e.g., the average of the last six measurements of efficiency); a keep time (e.g., the time since the last bitrate change); a current bitrate; an estimated bitrate (e.g., the bitrate at which the calculated network throughput can sustain playback); and a reason for last bitrate change.

After the statistics are received, a set of checks (e.g., comparisons) is performed using the statistics to determine a system state. For example, a first check comprises a determination of whether the server latency is greater than the average buffer level (e.g., whether the time to establish a connection to the server could be too long to sustain a smooth playback); a second check comprises a determination of whether the server latency is greater than the buffer level (e.g., again, whether the time to establish a connection to the server could be too long to sustain a smooth playback); a third check comprises a determination of whether the average buffer level is greater than the stable buffer time (e.g., whether the average buffer level is enough to support a smooth playback); a fourth check comprises a determination of whether the buffer level is greater than 95% of the average buffer level or 130% of the stable buffer time (e.g., whether the current buffer level is good and allows for moving the bitrate higher); a fifth check comprises a determination of whether the buffer level is greater than 70% of the stable buffer time (e.g., whether the current buffer level is enough to support a smooth playback); a sixth check comprises a determination of whether the live latency is greater than the target latency or the stable buffer time or 2.5× the segment duration (e.g., whether the live latency is too long and playback needs to catch up); a seventh check comprises a determination of whether the last bitrate change was as a result of poor latency; an eighth check comprises a determination of whether the efficiency is less than zero (e.g., whether the time to download and process a segment is longer than the segment duration, requiring bitrate reduction); a ninth check comprises a determination of whether the keep time is greater than a threshold value (e.g., 30 seconds); and a tenth check comprises a determination of whether the estimated bitrate is greater than the bitrate (e.g., whether the estimated network throughput is larger than the current bitrate, indicating an opportunity to increase the bitrate). Results of the ten checks comprise a description of the system state and allow a determination of a bitrate adjustment to be made. Performing a set of logical operations on the results of the checks yields one of four results: the bitrate is kept constant; the bitrate is set to a minimum available bitrate; the bitrate is adjusted downwards, or the bitrate is tuned based at least in part on the buffer level. A process for adjusting the bitrate downwards comprises adjusting the bitrate downwards one increment at a time until the measured efficiency is greater than zero. A process for tuning the bitrate based at least in part on the buffer level performs another set of logical operations on the results of the checks and adjusts the bitrate up or down based at least in part on the buffer level. The system for bitrate adaptation for low latency streaming continues adjusting the streaming bitrate until video streaming is complete. The system for bitrate adaptation for low latency streaming improves the computer system by automatically optimizing the streaming bitrate for low latency, a criterion important for streaming of live events and one previously not optimized for.

FIG. 1 is a block diagram illustrating an embodiment of a network system for a system for multiple view streaming. In some embodiments, the network system of FIG. 1 comprises a network system for a system for providing video playback. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Video recording device 102 records video data and provides video data to video streaming server system 104. Video streaming server system 104 and video streaming client system 106 communicate via network 100. Video streaming client system 106 provides video data to video playback device 108. In some embodiments, video streaming client system 106 and video playback device comprise a single system. Video streaming client system 106 comprises a system for bitrate adaptation for low latency streaming. For example, video streaming client system 106 comprises an interface configured to receive statistics, wherein the statistics comprise a server latency and a buffer level, and a processor configured to perform a set of checks based at least in part on the statistics, determine a streaming bitrate based at least in part on the set of checks, and indicate the streaming bitrate.

Figure 2:
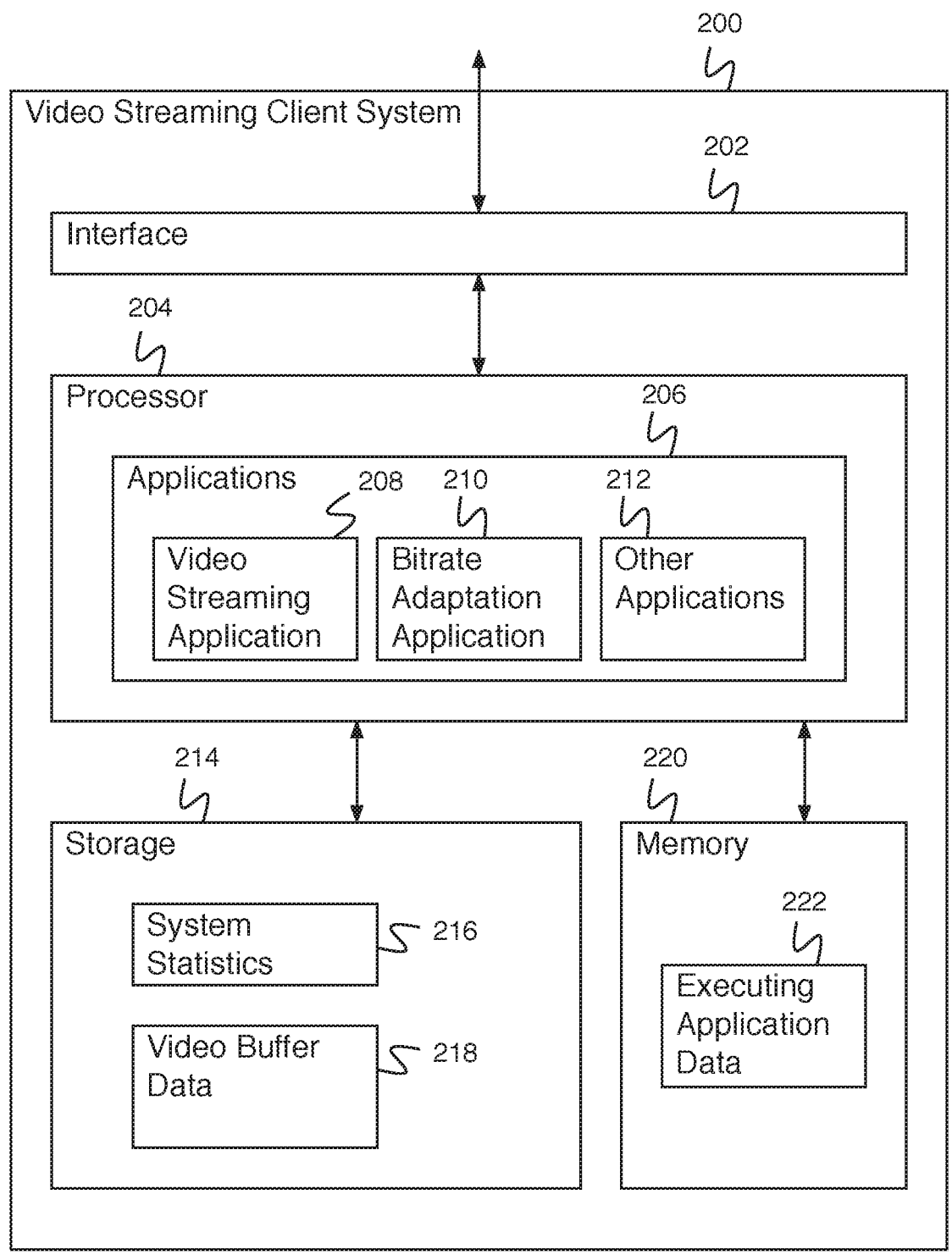
FIG. 2 is a block diagram illustrating an embodiment of a video streaming client system.

FIG. 2 is a block diagram illustrating an embodiment of a video streaming client system. In some embodiments, video streaming client system 200 comprises video streaming client system 106 of FIG. 1. In the example shown, video streaming client system 200 comprises interface 202. For example, interface 202 comprises an interface for receiving video data, receiving system performance information, receiving statistics, providing a request for data, providing an indication of a bitrate change, etc. Processor 204 comprises a processor for executing applications 206. Applications 206 comprise video streaming application 208, bitrate adaptation algorithm 210, and other applications 212. Video streaming application 208 comprises an application for communicating with a video streaming server system for streaming video data. Bitrate adaptation application 210 comprises an algorithm for determining and adapting a video streaming bitrate (e.g., for video streaming application 208). For example, bitrate adaptation application 210 determines a bitrate adaptation and provides an indication of the bitrate adaptation (e.g., to video streaming application 208 or to a video streaming server system). For example, bitrate adaptation application 210 comprises an application configured to perform a set of checks based at least in part on the statistics, determine a streaming bitrate based at least in part on the set of checks, and indicate the streaming bitrate. Other applications 212 comprises any other appropriate applications (e.g., a communications application, a data storage and retrieval application, a web browser application, a user interface application, a data analysis application, etc.). Storage 214 comprises system statistics 216 (e.g., a set of statistics describing system performance) and video buffer data 218 (e.g., a set of buffered video stream frames). Memory 220 comprises executing application data 222 comprising data associated with applications 206.

Figure 3:
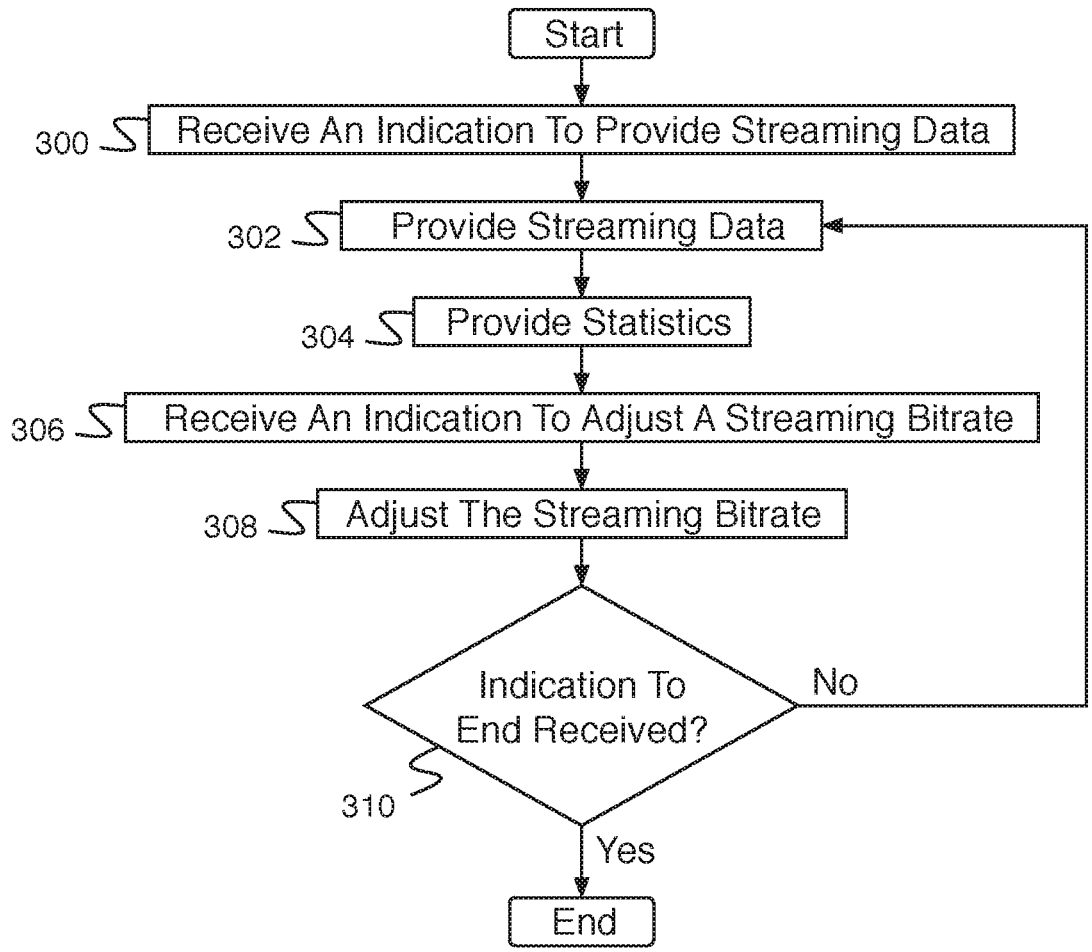
FIG. 3 is a flow diagram illustrating an embodiment of a process for streaming video data.

FIG. 3 is a flow diagram illustrating an embodiment of a process for streaming video data. In some embodiments, the process of FIG. 3 is executed by video streaming server system 104. In the example shown, in 300, an indication to provide streaming data is received. For example, an indication to provide streaming data is received from a video streaming client system. In 302, streaming data is provided. For example, a set of video frames are provided via a network. In 304, statistics are provided. For example, statistics describing video streaming performance are provided. In 306, an indication to adjust a streaming bitrate is received. For example, the indication to adjust a streaming bitrate comprises an indication to change a frame image resolution of provided video data frames. In 308, the streaming bitrate is adjusted. In 310, it is determined whether an indication to end has been received. For example, it is determined whether an indication to end streaming is received. In the event it is determined that an indication to end has not been received, control passes to 302. In the event it is determined that an indication to end has been received, the process ends.

Figure 4:
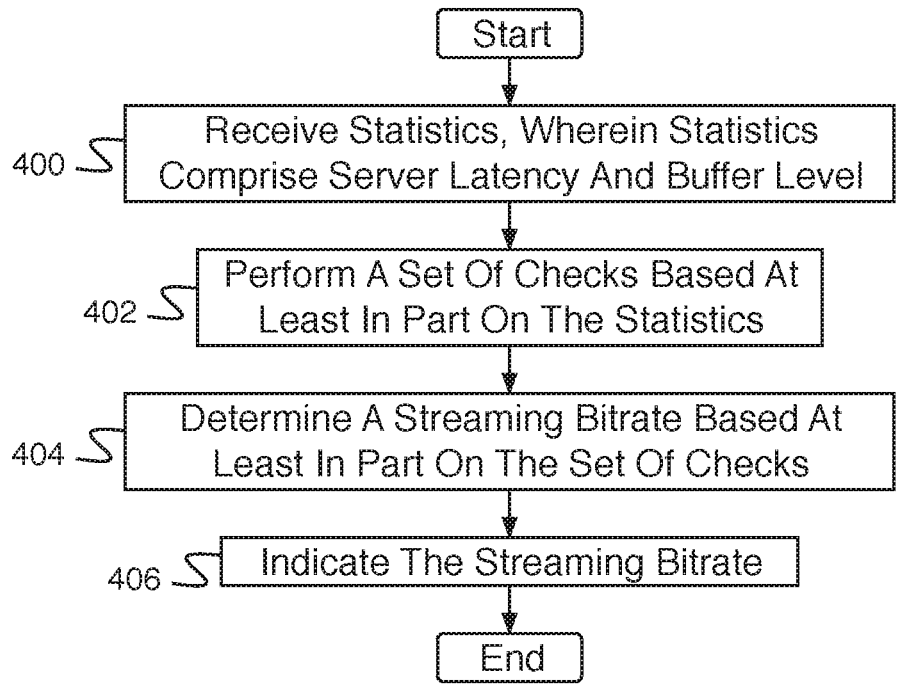
FIG. 4 is a flow diagram illustrating an embodiment of a process for bitrate adaptation for low latency streaming.

FIG. 4 is a flow diagram illustrating an embodiment of a process for bitrate adaptation for low latency streaming. In some embodiments, the process of FIG. 4 is executed by video streaming content system 106 of FIG. 1. In the example shown, in 400, statistics are received, wherein the statistics comprise a server latency and a buffer level. In various embodiments, statistics comprise one or more of a server latency, a live latency, a target latency, a buffer level, an average buffer level, an efficiency, an average efficiency, a keep time, a current bitrate, an estimated bitrate, a stable buffer time, a segment duration, or a reason for latest bitrate change. In some embodiments, receiving statistics comprises determining statistics. In 402, a set of checks is performed based at least in part on the statistics. For example, a check of the set of checks comprises a comparison of a first statistic of the statistics with a second statistic of the statistics, or a check of the set of checks comprises a comparison of a statistic of the statistics with a threshold value. In 404, a streaming bitrate is determined based at least in part on the set of checks. For example, the streaming bitrate is determined based at least in part on the result of a logical operation on a result of a first check of the set of checks and a result of a second check of the set of checks. In various embodiments, determining the streaming bitrate comprises determining to set the streaming bitrate to a minimum streaming bitrate, determining to maintain the streaming bitrate at the current streaming bitrate, or determining to tune the streaming bitrate based at least in part on the set of checks, wherein tuning the streaming bitrate comprises determining to adjust the streaming bitrate to a higher bitrate or determining to adjust the streaming bitrate to a lower bitrate. For example, it is determined to adjust the streaming bitrate to a lower bitrate in response to an efficiency check indicating an inefficient download, or is determined to adjust the streaming bitrate to a higher bitrate in response to an efficiency check indicating an efficient download. In 406, the streaming bitrate is indicated. For example, the streaming bitrate is indicated to a streaming server.

Figure 5:
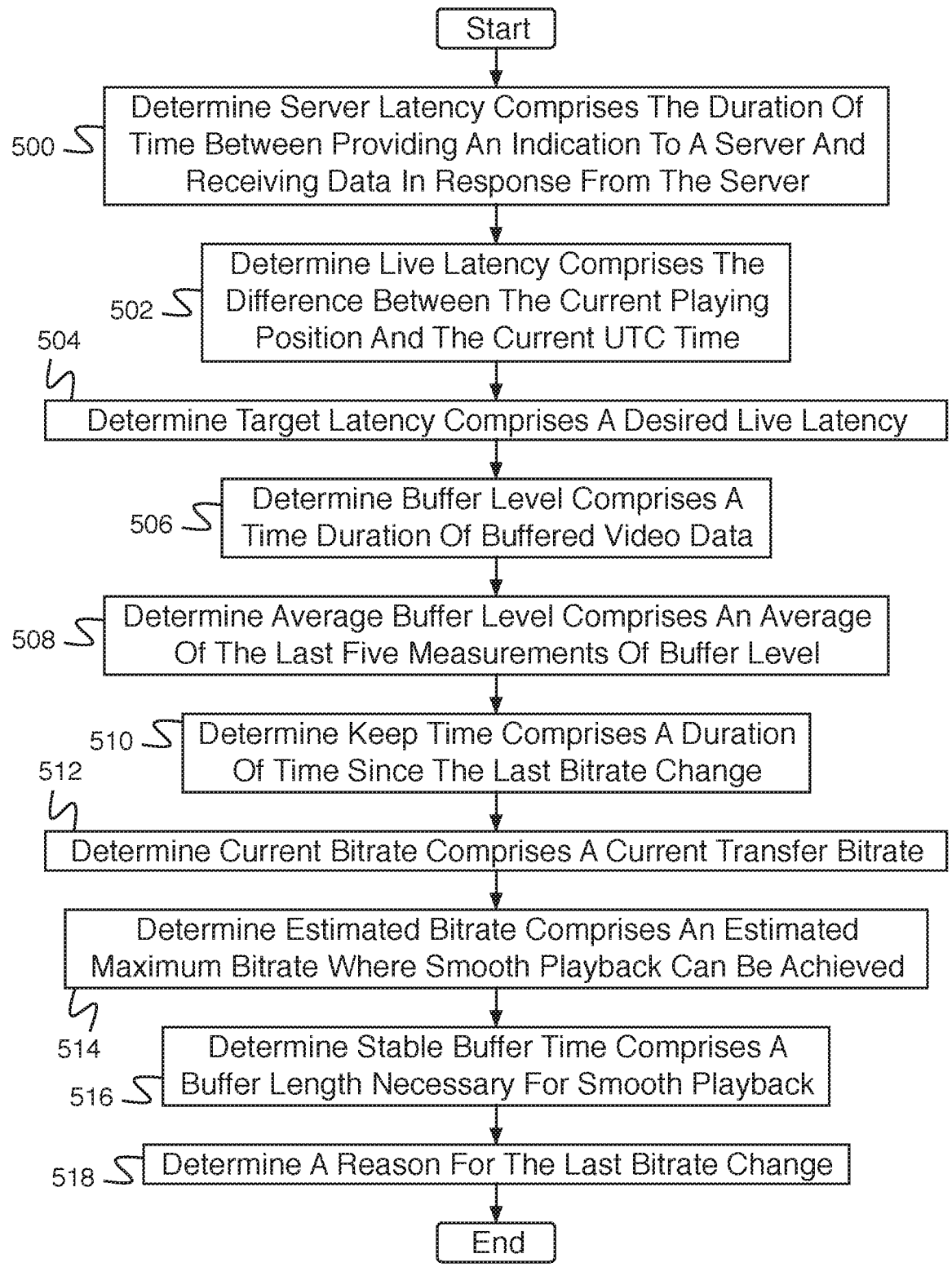
FIG. 5 is a flow diagram illustrating an embodiment of a process for receiving statistics.

FIG. 5 is a flow diagram illustrating an embodiment of a process for receiving statistics. In some embodiments, the process of FIG. 5 implements 400 of FIG. 4. In the example shown, in 500, server latency is determined to comprise the duration of time between providing an indication to a server and receiving data in response from the server. In 502, live latency is determined to comprise the difference between the current playing position and the current coordinated universal time (UTC) time. In 504, target latency is determined to comprise a desired live latency. In 506, buffer level is determined to comprise a time duration of buffered video data. In 508, average buffer level is determined to comprise an average of the last five measurements of buffer level. In 510, keep time is determined to comprise a duration of time since the last bitrate change. In 512, the current bitrate is determined to comprise a current transfer bitrate. In 514, estimated bitrate is determined to comprise an estimated maximum bitrate where smooth playback can be achieved. For example, given the current network conditions determine an estimated maximum bitrate where smooth playback can be achieved. In 516, stable buffer time is determined to comprise a buffer length necessary for smooth playback. In 518, a reason for the last bitrate change is determined.

Figure 6:
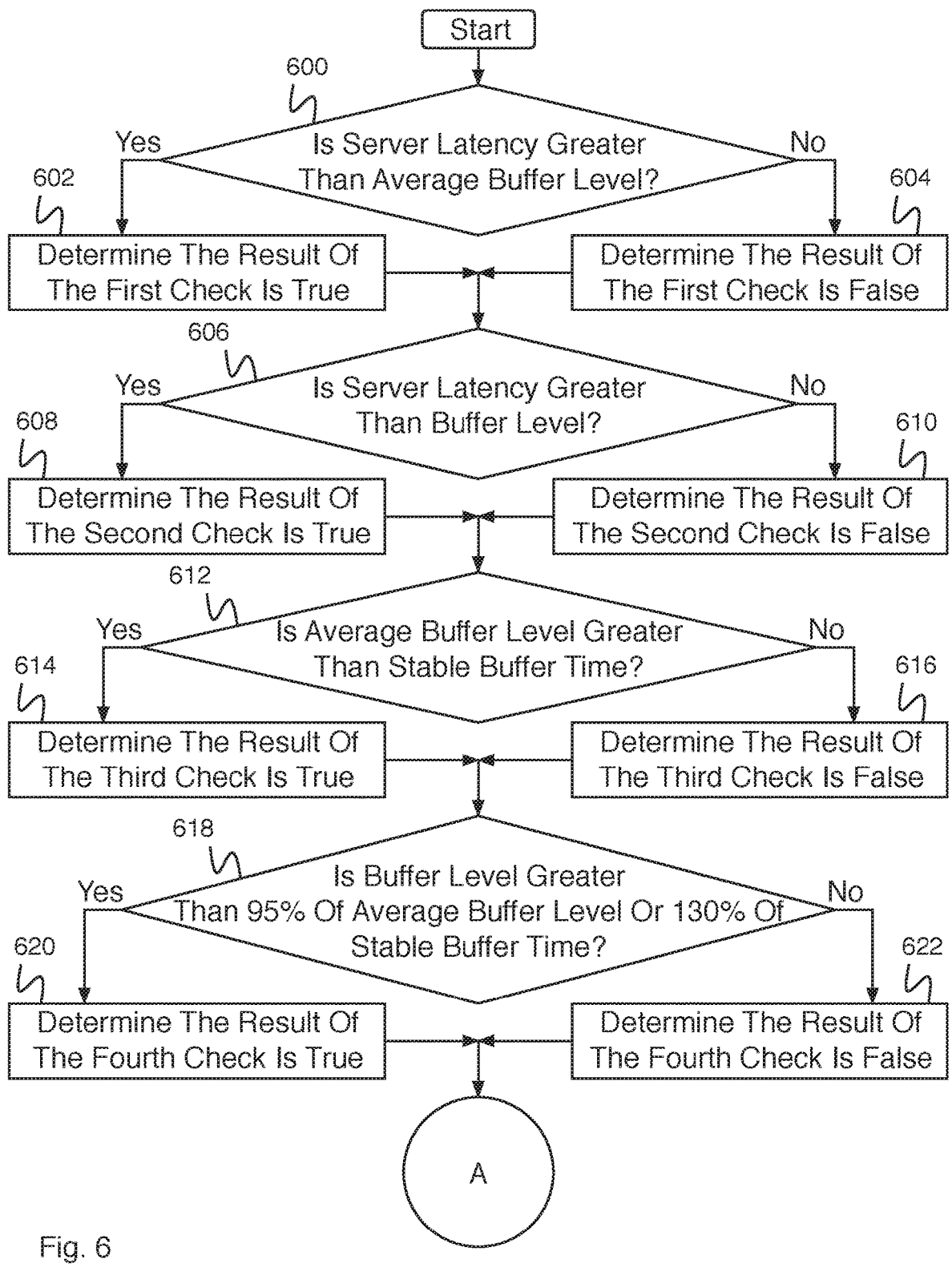
FIG. 6 is a flow diagram illustrating an embodiment of a first part of a process for performing a set of checks.

FIG. 6 is a flow diagram illustrating an embodiment of a first part of a process for performing a set of checks. In some embodiments, the process for performing a set of checks implements 402 of FIG. 4. In the example shown, in 600, it is determined whether the server latency is greater than the average buffer level. In the event it is determined that the server latency is greater than the average buffer level, control passes to 602. In 602, it is determined that the result of the first check is true, and control then passes to 606. In the event it is determined in 600 that the server latency is not greater than the average buffer level, control passes to 604. In 604, it is determined that the result of the first check is false, and control then passes to 606.

In 606, it is determined whether the server latency is greater than the buffer level. In the event it is determined that the server latency is greater than the buffer level, control passes to 608. In 608, it is determined that the result of the second check is true, and control then passes to 612. In the event it is determined in 606 that the server latency is not greater than the buffer level, control passes to 610. In 610, it is determined that the result of the second check is false, and control then passes to 612.

In 612, it is determined whether the average buffer level is greater than the stable buffer time. In the event it is determined that the average buffer level is greater than the stable buffer time, control passes to 614. In 614, it is determined that the result of the third check is true, and control then passes to 618. In the event it is determined in 612 that the average buffer level is not greater than the stable buffer time, control passes to 616. In 616, it is determined that the result of the third check is false, and control then passes to 618.

In 618, it is determined whether the buffer level is greater than 95% of the average buffer level or 130% of the stable buffer time. In the event it is determined that the buffer level is greater than 95% of the average buffer level or 130% of the stable buffer time, control passes to 620. In 620, it is determined that the result of the fourth check is true, and control then passes to A. In the event it is determined in 618 that the buffer level is neither greater than 95% of the average buffer level nor greater than 130% of the stable buffer time, control passes to 622. In 622, it is determined that the result of the fourth check is false, and control then passes to A.

Figure 7:
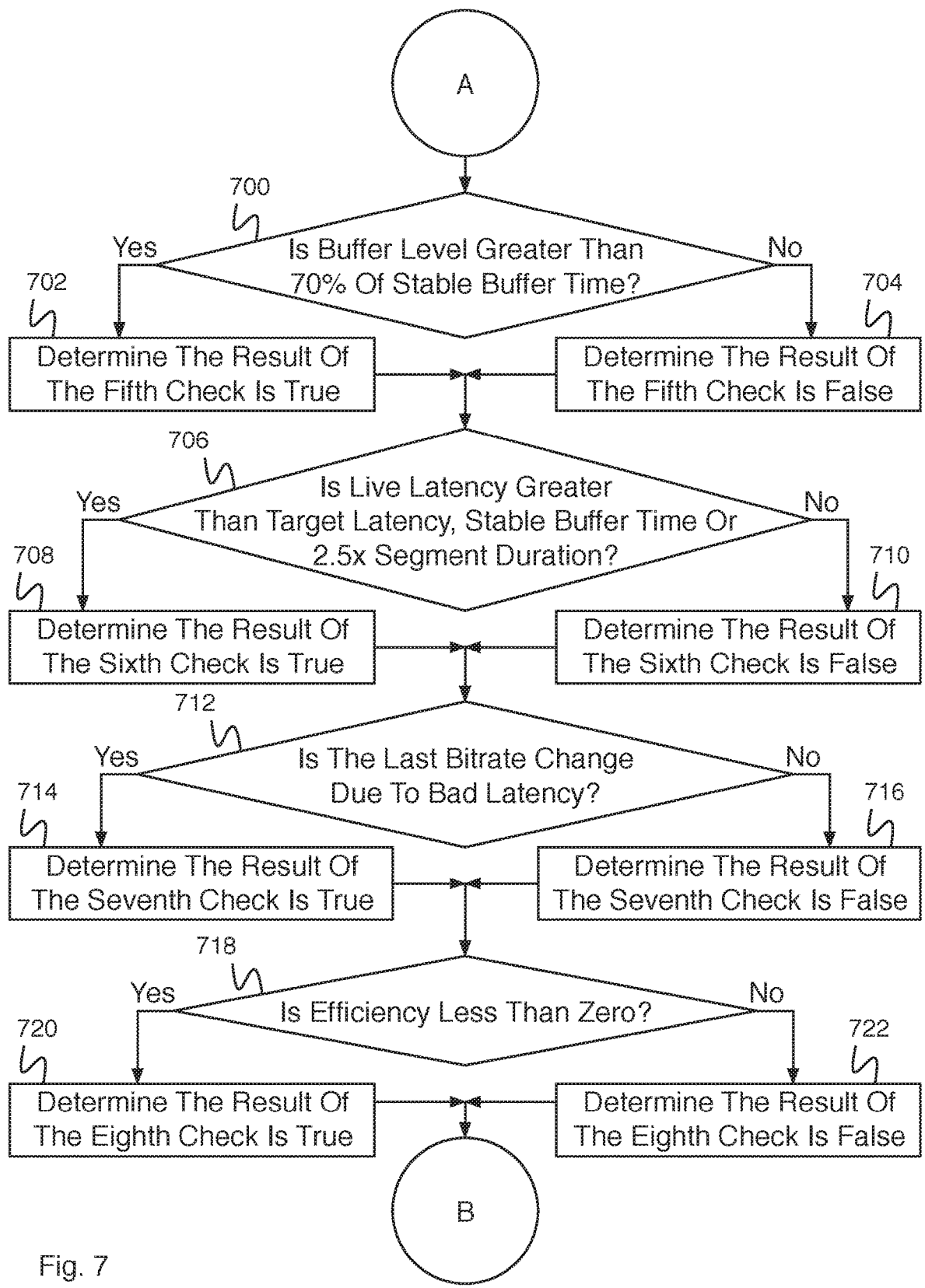
FIG. 7 is a flow diagram illustrating an embodiment of a second part of a process for performing a set of checks.

FIG. 7 is a flow diagram illustrating an embodiment of a second part of a process for performing a set of checks. In some embodiments, the process of FIG. 7 comprises a continuation of the process of FIG. 6. In the example shown, control begins at A (e.g., the process continues from A of FIG. 6). Control then passes to 700. In 700, it is determined whether the buffer level is greater than 70% of the stable buffer time. In the event it is determined that the buffer level is greater than 70% of the stable buffer time, control passes to 702. In 702, it is determined that the result of the fifth check is true, and control then passes to 706. In the event it is determined in 700 that the buffer level is not greater than 70% of the stable buffer time, control passes to 704. In 704, it is determined that the result of the fifth check is false, and control then passes to 706.

In 706, it is determined whether the live latency is greater than the target latency, the stable buffer time, or 2.5× the segment duration. In the event it is determined that the live latency is greater than the target latency, the stable buffer time, or 2.5× the segment duration, control passes to 708. In 708, it is determined that the result of the sixth check is true, and control then passes to 712. In the event it is determined in 706 that the live latency is neither greater than the target latency, the stable buffer time, nor is greater than 2.5× the segment duration, control passes to 710. In 710, it is determined that the result of the sixth check is false, and control then passes to 712.

In 712, it is determined whether the last bitrate change is due to bad latency. In the event it is determined that the last bitrate change is due to bad latency, control passes to 714. In 714, it is determined that the result of the seventh check is true, and control then passes to 718. In the event it is determined in 712 that the last bitrate change is not due to bad latency, control passes to 716. In 716, it is determined that the result of the seventh check is false, and control then passes to 718.

In 718, it is determined whether the efficiency is less than zero. In the event it is determined that the efficiency is less than zero, control passes to 720. In 720, it is determined that the result of the eighth check is true, and control then passes to B. In the event it is determined in 718 that the efficiency is not less than zero, control passes to 722. In 722, it is determined that the result of the eighth check is false, and control then passes to B.

Figure 8:
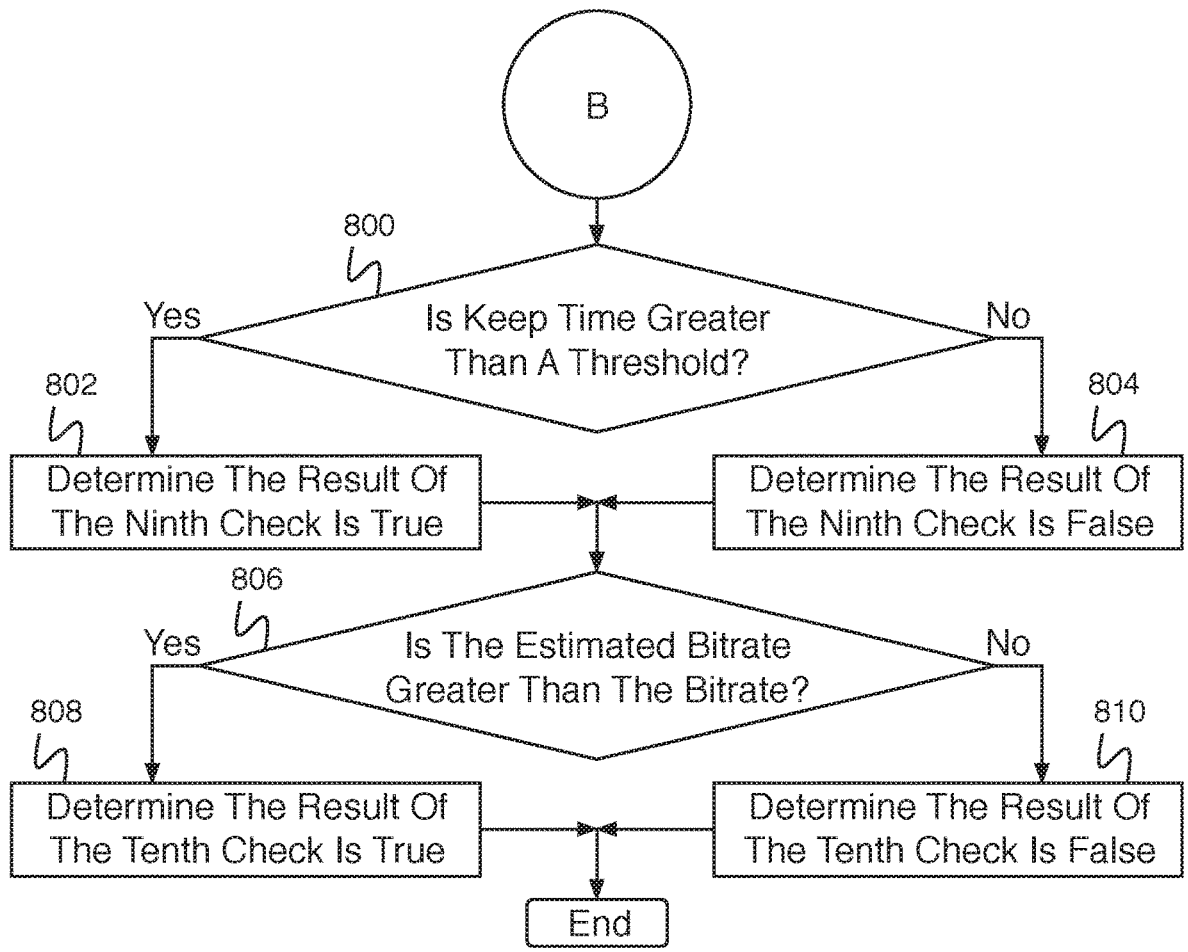
FIG. 8 is a flow diagram illustrating an embodiment of a third part of a process for performing a set of checks.

FIG. 8 is a flow diagram illustrating an embodiment of a third part of a process for performing a set of checks. In some embodiments, the process of FIG. 8 comprises a continuation of the process of FIG. 7. In the example shown, control begins at B (e.g., the process continues from B of FIG. 7). Control then passes to 800. In 800, it is determined whether the keep time is greater than a threshold. For example, the threshold comprises 30 seconds. In the event it is determined that the keep time is greater than a threshold, control passes to 802. In 802, it is determined that the result of the ninth check is true, and control then passes to 806. In the event it is determined in 800 that the keep time is not greater than a threshold, control passes to 804. In 804, it is determined that the result of the ninth check is false, and control then passes to 806.

In 806, it is determined whether the estimated bitrate is greater than the bitrate. In the event it is determined that the estimated bitrate is greater than the bitrate, control passes to 808. In 808, it is determined that the result of the tenth check is true, and the process then ends. In the event it is determined in 806 that the estimated bitrate is not greater than the bitrate, control passes to 810. In 810, it is determined that the result of the tenth check is false, and the process then ends.

In various embodiments, the system determines a number of checks used for determining a streaming bitrate, where the checks are determined in series (e.g., as shown in FIG. 6, FIG. 7, and FIG. 8), the checks are determined in parallel (e.g., 600, 606, 612, 618 of FIG. 6, 700, 706, 712, 718 of FIG. 7, and 800 and 806 of FIG. 8 are each performed in parallel to produce states of the checks), the checks are determined in parallel and series (e.g., a set of groups that are done in parallel where each group includes a set of serial checks in series or a set of groups that are done in series where each group includes a set of checks in parallel to produce the states of the checks), the checks are performed periodically or asynchronously (e.g., 600, 606, 612, 618 of FIG. 6, 700, 706, 712, 718 of FIG. 7, and 800 and 806 of FIG. 8 are each performed periodically or asynchronously to produce states of the checks), or any other appropriate manner of determining the checks.

Figure 9:
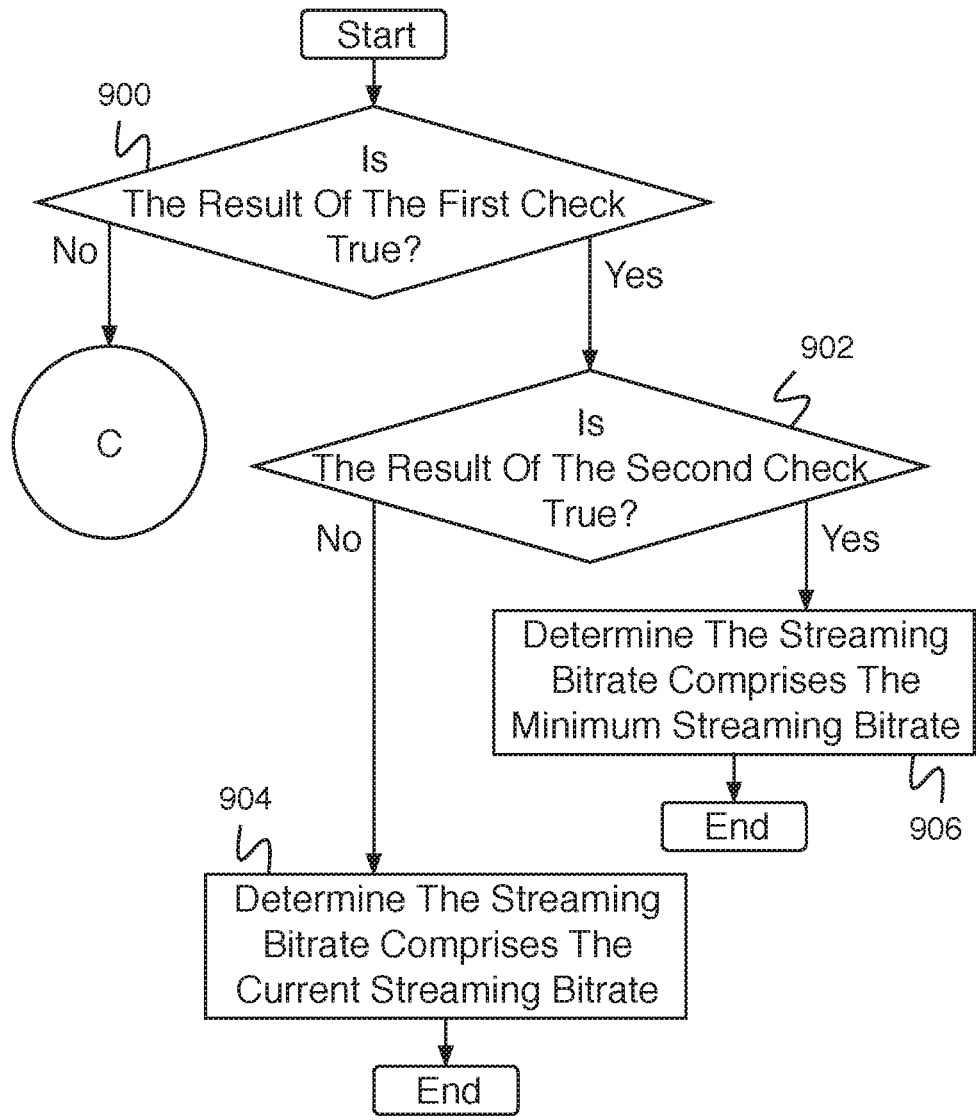
FIG. 9 is a flow diagram illustrating an embodiment of a first part of a process for determining a streaming bitrate based at least in part on checks.

FIG. 9 is a flow diagram illustrating an embodiment of a first part of a process for determining a streaming bitrate based at least in part on checks. In some embodiments, the process for determining a streaming bitrate based at least in part on checks implements 404 of FIG. 4. In the example shown, in 900, it is determined whether the result of the first check is true. In the event it is determined that the result of the first check is not true, control passes to C. In the event it is determined that the result of the first check is true, control passes to 902. In 902, it is determined whether the result of the second check is true. In the event it is determined that the result of the second check is not true, control passes to 904. In 904, it is determined that the streaming bitrate comprises the current bitrate. The process then ends. In the event it is determined in 902 that the result of the second check is true, control passes to 906. In 906, it is determined that the streaming bitrate comprises the minimum streaming bitrate.

Figure 10:
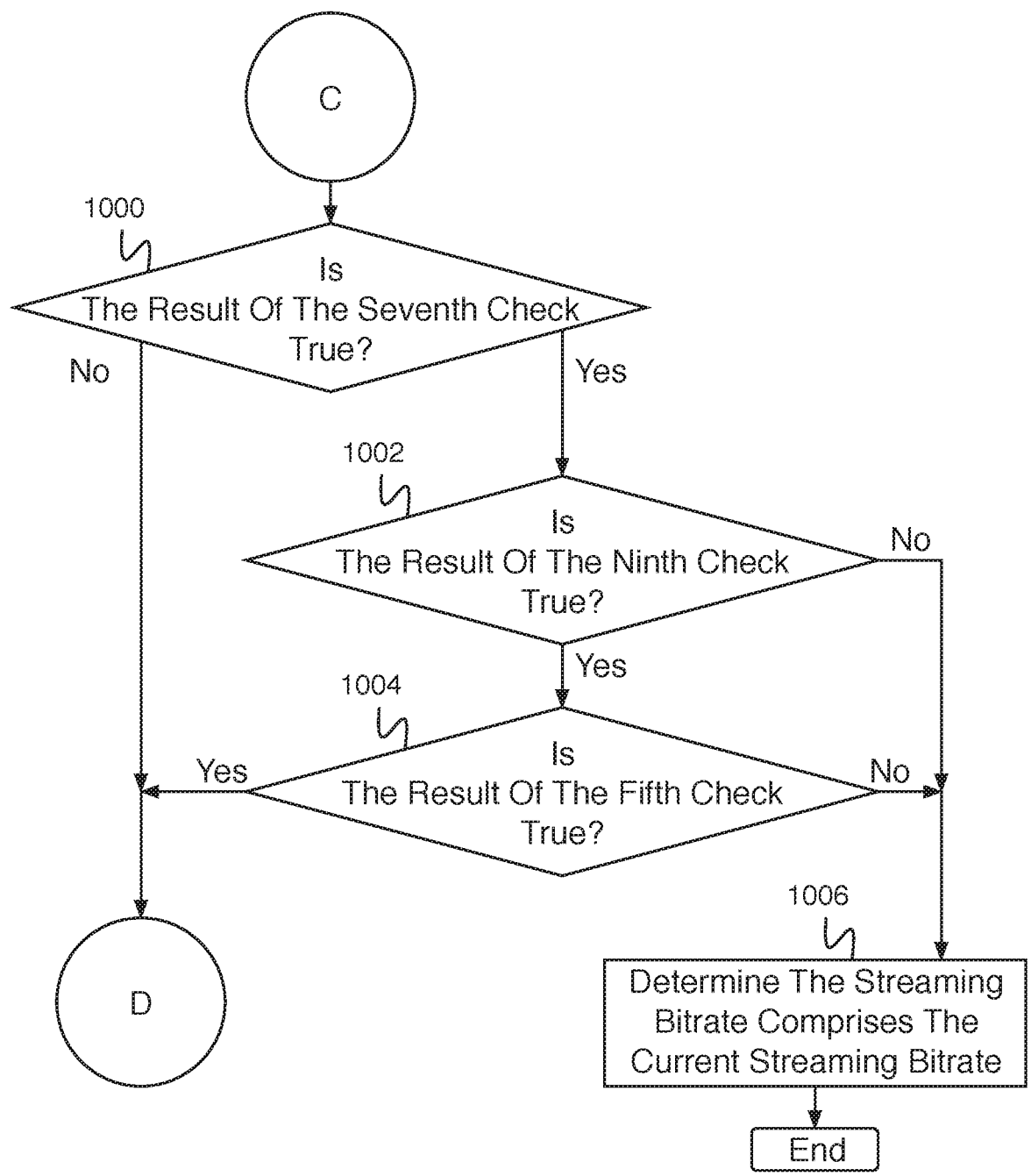
FIG. 10 is a flow diagram illustrating an embodiment of the second part of a process for determining a streaming bitrate based at least in part on checks.

FIG. 10 is a flow diagram illustrating an embodiment of the second part of a process for determining a streaming bitrate based at least in part on checks. In some embodiments, the process of FIG. 10 comprises a continuation of the process of FIG. 9. In the example shown, control begins at C (e.g., the process continues from C of FIG. 9). Control then passes to 1000. In 1000, it is determined whether the result of the seventh check is true. In the event it is determined that the result of the seventh check is not true, control passes to D. In the event it is determined that the result of the seventh check is true, control passes to 1002. In 1002, it is determined whether the result of the ninth check is true. In the event it is determined that the result of the ninth check is not true, control passes to 1006. In the event it is determined that the result of the ninth check is true, control passes to 1004. In 1004, it is determined whether the result of the fifth check is true. In the event it is determined that the result of the fifth check is true, control passes to D. In the event it is determined that the result of the fifth check is not true, control passes to 1006. In 1006, it is determined that the streaming bitrate comprises the current streaming bitrate, and the process ends.

Figure 11:
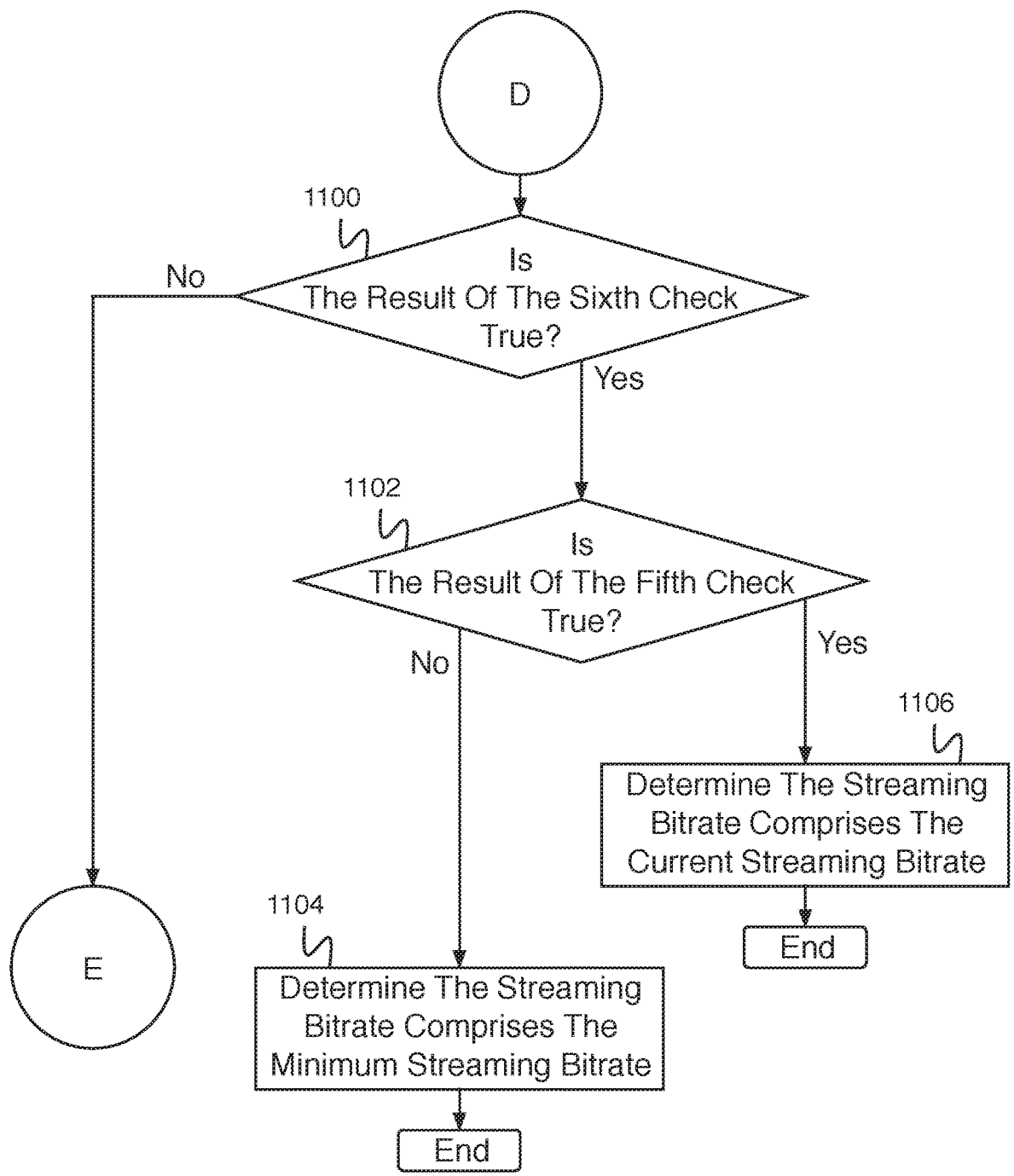
FIG. 11 is a flow diagram illustrating an embodiment of the third part of a process for determining a streaming bitrate based at least in part on checks.

FIG. 11 is a flow diagram illustrating an embodiment of the third part of a process for determining a streaming bitrate based at least in part on checks. In some embodiments, the process of FIG. 11 comprises a continuation of the process of FIG. 10. In the example shown, control begins at D (e.g., the process continues from D of FIG. 10). Control then passes to 1100. In 1100, it is determined whether the result of the sixth check is true. In the event it is determined that the result of the sixth check is not true, control passes to E. In the event it is determined that the result of the sixth check is true, control passes to 1102. In 1102, it is determined whether the result of the fifth check is true. In the event it is determined that the result of the fifth check is not true, control passes to 1104. In 1104, it is determined that the streaming bitrate comprises the minimum streaming bitrate, and the process then ends. In the event it is determined in 1102 that the result of the fifth check is true, control passes to 1106. In 1106, it is determined that the streaming bitrate comprises the current streaming bitrate, and the process ends.

Figure 12:
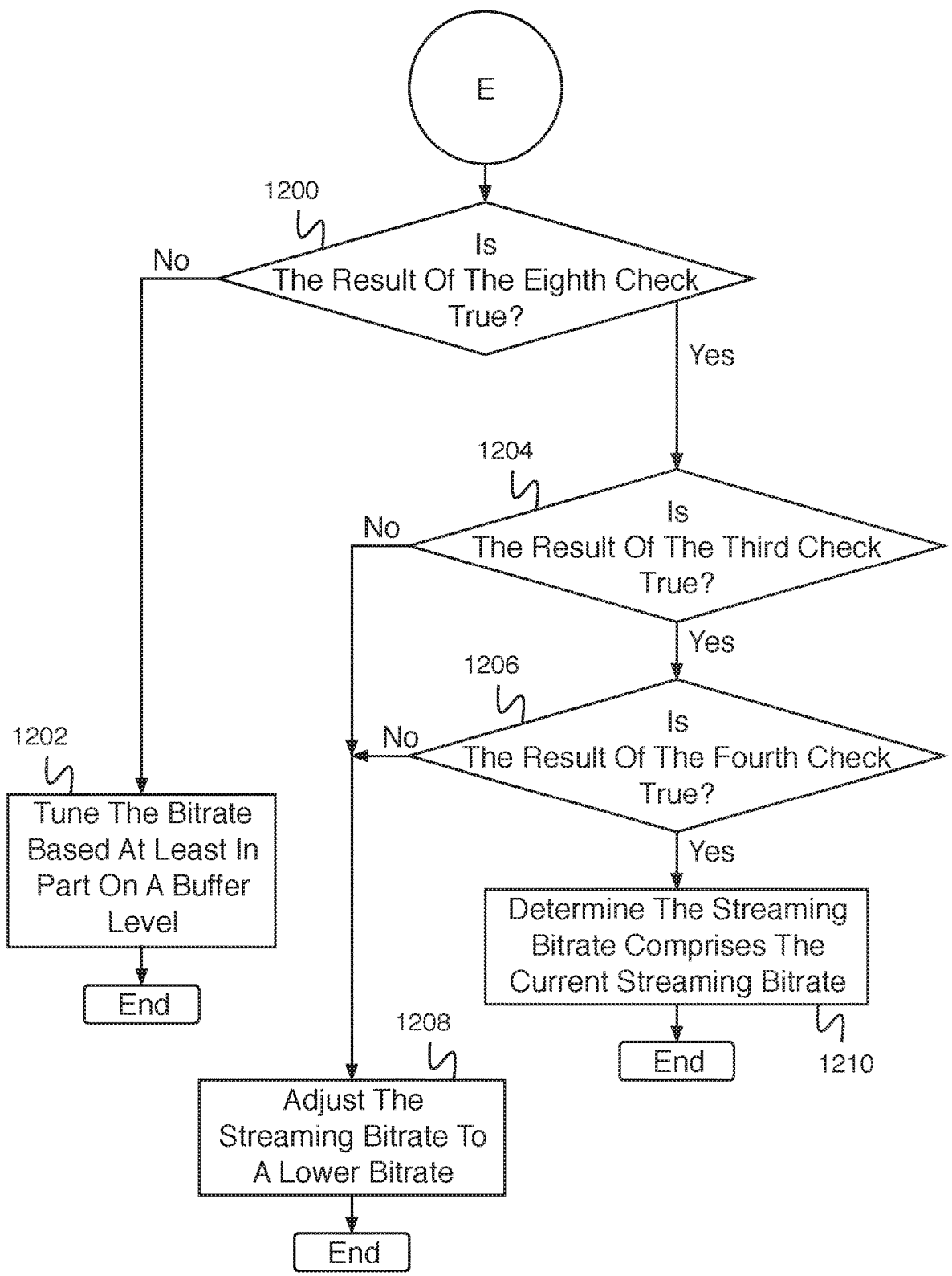
FIG. 12 is a flow diagram illustrating an embodiment of the fourth part of a process for determining a streaming bitrate based at least in part on checks.

FIG. 12 is a flow diagram illustrating an embodiment of the fourth part of a process for determining a streaming bitrate based at least in part on checks. In some embodiments, the process of FIG. 12 comprises a continuation of the process of FIG. 11. In the example shown, control begins at E (e.g., the process continues from E of FIG. 11). Control then passes to 1200. In 1200, it is determined whether the result of the eighth check is true. In the event it is determined that the result of the eighth check is not true, control passes to 1202. In 1202, the bitrate is tuned based at least in part on a buffer level, and the process then ends. In the event it is determined in 1200 that the result of the eighth check is true, control passes to 1204. In 1204, it is determined whether the result of the third check is true. In the event it is determined that the result of the third check is not true, control passes to 1208. In the event it is determined that the result of the third check is true, control passes to 1206. In 1206, it is determined whether the result of the fourth check is true. In the event it is determined that the result of the fourth check is not true, control passes to 1208. In 1208, the streaming bitrate is adjusted to a lower bitrate, and the process then ends. In 1206, in the event it is determined that the result of the fourth check is true, control passes to 1210. In 1210, it is determined that the streaming bitrate comprises the current streaming bitrate, and the process ends.

Figure 13:
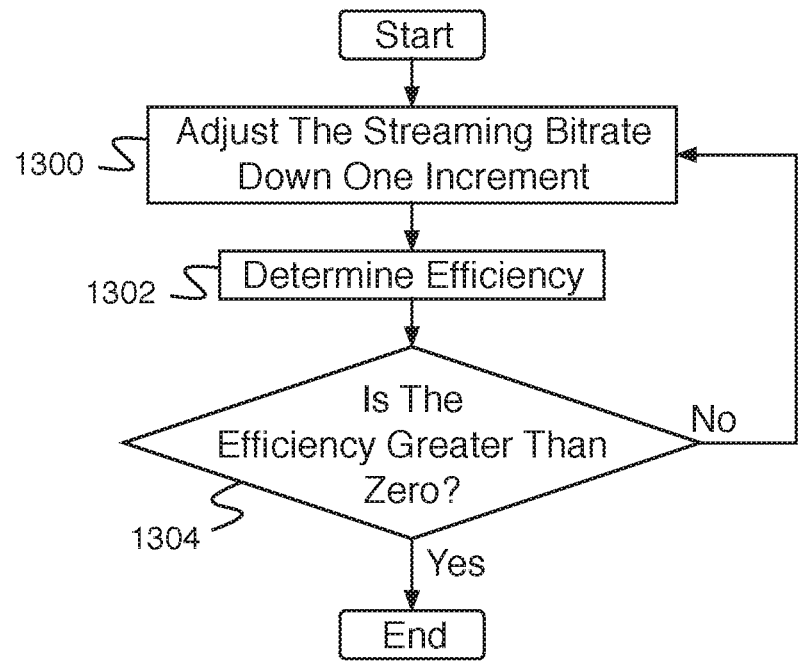
FIG. 13 is a flow diagram illustrating an embodiment of a process for adjusting a streaming bitrate to a lower bitrate.

FIG. 13 is a flow diagram illustrating an embodiment of a process for adjusting a streaming bitrate to a lower bitrate. In some embodiments, the process of FIG. 13 implements 1208 of FIG. 12. In the example shown, in 1300, the streaming bitrate is adjusted down one increment. For example, the streaming bitrate is adjusted down by a minimum amount. In 1302, efficiency is determined. In 1304, it is determined whether efficiency is greater than zero. For example, efficiency is greater than zero in the event it takes a segment less time to download than the playback time of the segment. In the event it is determined that the efficiency is not greater than zero, control passes to 1300. In the event it is determined that the efficiency is greater than zero, the process ends.

Figure 14:
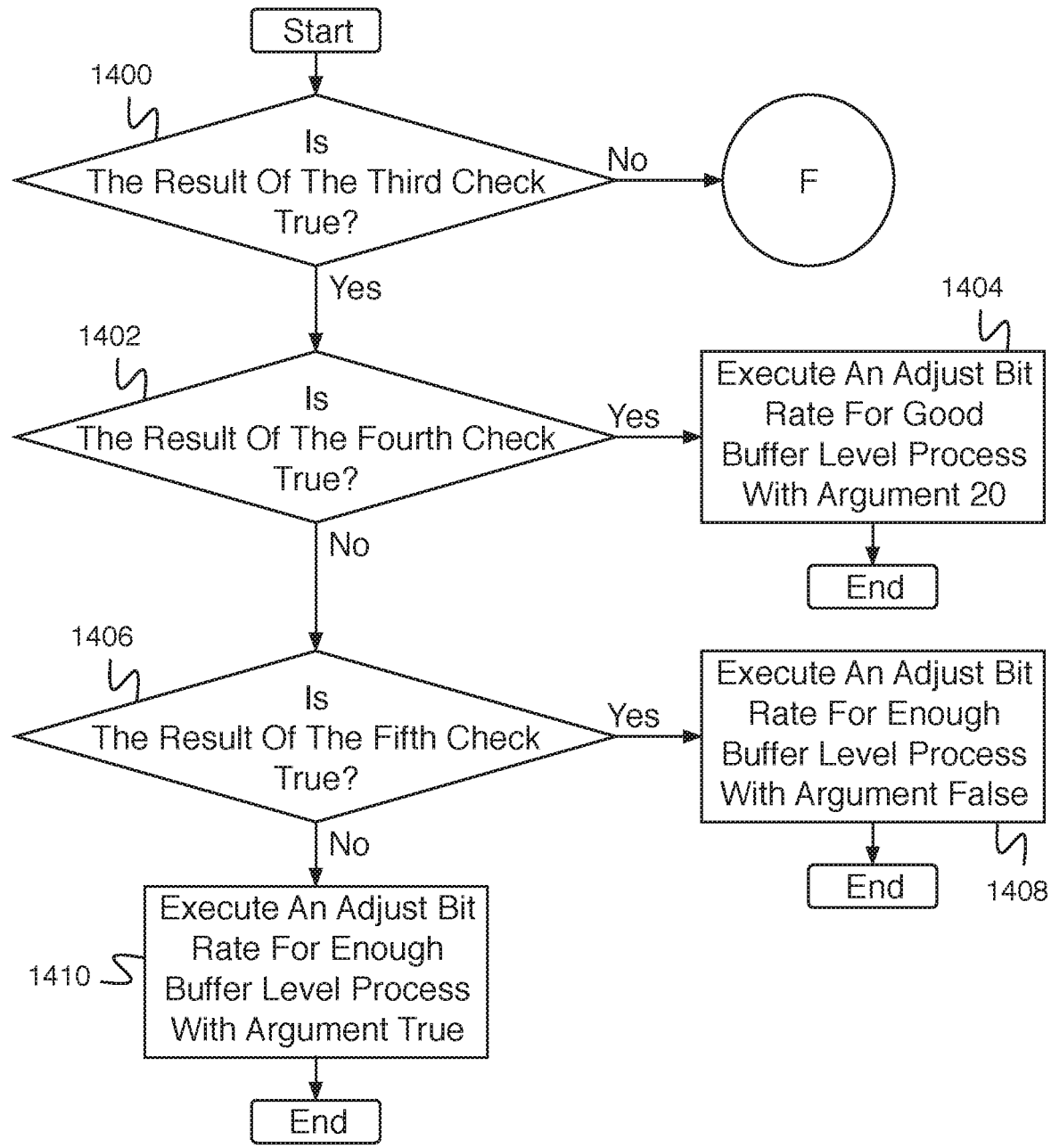
FIG. 14 is a flow diagram illustrating an embodiment of the first part of a process for tuning a bitrate based at least in part on a buffer level.

FIG. 14 is a flow diagram illustrating an embodiment of the first part of a process for tuning a bitrate based at least in part on a buffer level. In some embodiments, the process for tuning a bitrate based at least in part on a buffer level implements 1202 of FIG. 12. In the example shown, in 1400, it is determined whether the result of the third check is true. In the event it is determined that the result of the third check is not true, control passes to F. In the event it is determined that the result of the third check is true, control passes to 1402. In 1402, it is determined whether the result of the fourth check is true. In the event it is determined that the result of the fourth check is true, control passes to 1404. In 1404, an adjust bit rate for good buffer level process is executed with argument 20, and the process then ends. In the event it is determined in 1402 that the result of the fourth check is not true, control passes to 1406. In 1406, it is determined whether the result of the fifth check is true. In the event it is determined that the result of the fifth check is true, control passes to 1408. In 1408, an adjust bit rate for enough buffer level process is executed with argument false. The process then ends. In the event it is determined in 1406 that the result of the fifth check is not true, control passes to 1410. In 1410, an adjust bit rate for enough buffer level process is executed with argument true, and the process ends.

Figure 15:
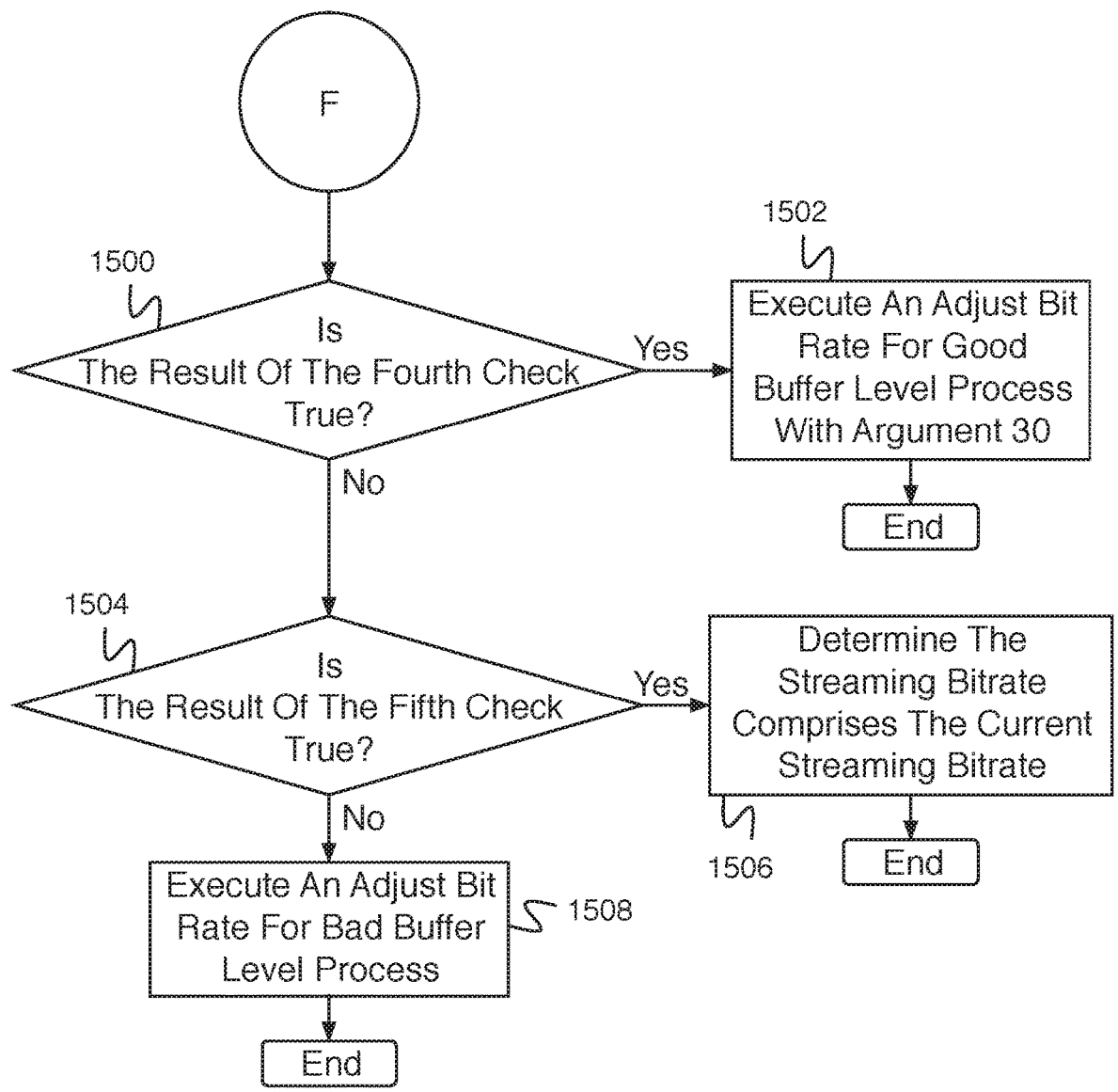
FIG. 15 is a flow diagram illustrating an embodiment of the second part of a process for tuning a bitrate based at least in part on a buffer level.

FIG. 15 is a flow diagram illustrating an embodiment of the second part of a process for tuning a bitrate based at least in part on a buffer level. In some embodiments, the process of FIG. 15 comprises a continuation of the process of FIG. 14. In the example shown, control begins at F (e.g., the process continues from F of FIG. 14). Control then passes to 1500. In 1500, it is determined whether the result of the fourth check is true. In the event it is determined that the result of the fourth check is true, control passes to 1502. In 1502, an adjust bit rate for good buffer level process is executed with argument 30, and the process then ends. In the event it is determined in 1500 that the result of the fourth check is not true, control passes to 1504. In 1504, it is determined whether the result of the fifth check is true. In the event it is determined that the result of the fifth check is true, control passes to 1506. In 1506, it is determined that the streaming bitrate comprises the current streaming bitrate, and the process ends. In various embodiments, instead of determining that the streaming bitrate comprises the current streaming bitrate in 1506, it is determined that the streaming bitrate comprises ABRForEnoughBufferLevel(false) it is determined that the streaming bitrate comprises either the current streaming bitrate or ABRForEnoughBufferLevel (false). In the event it is determined in 1504 that the result of the fifth check is not true, control passes to 1508. In 1508, an adjust bit rate for bad buffer level process is executed, and the process ends.

Figure 16:
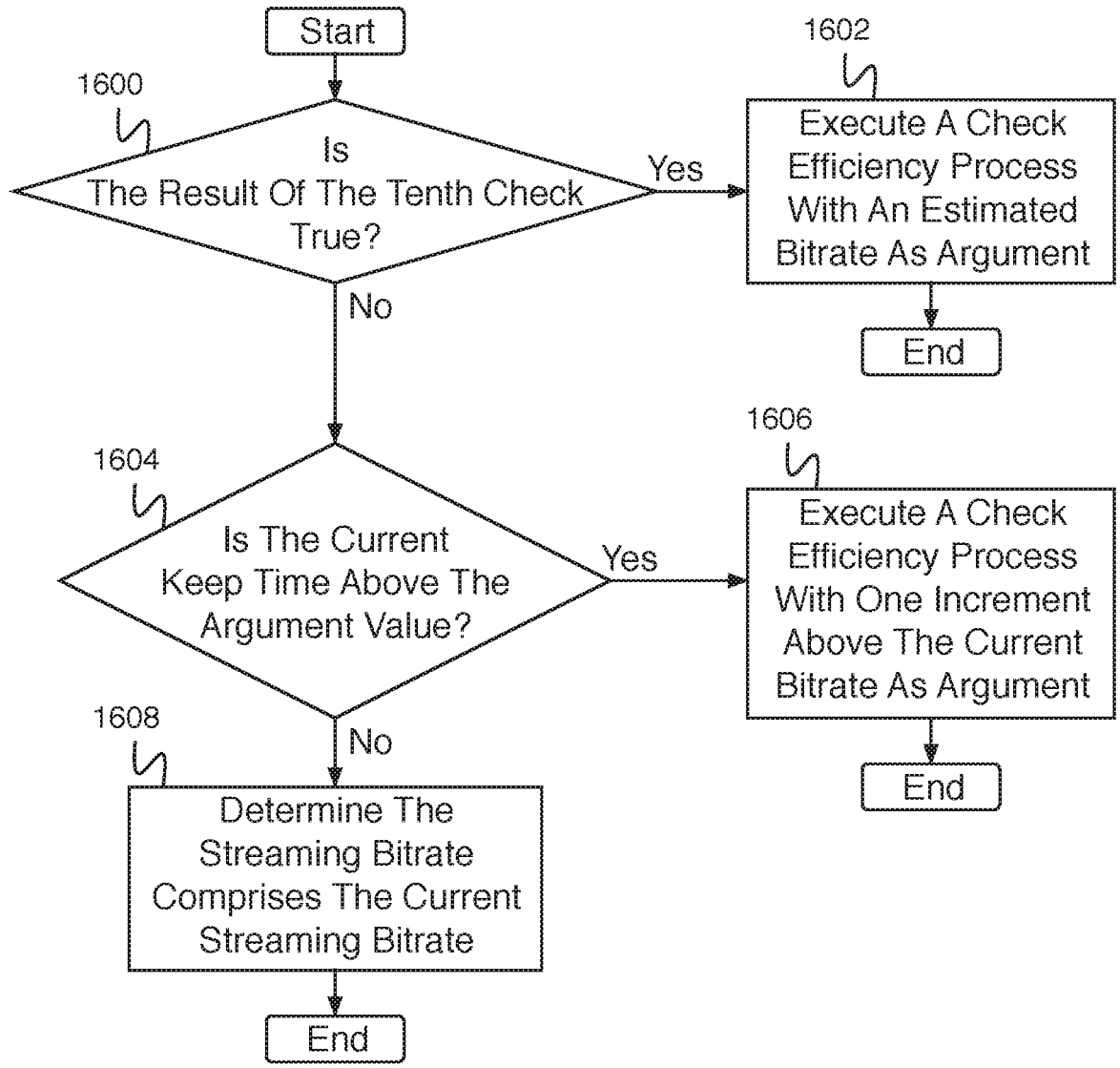
FIG. 16 is a flow diagram illustrating an embodiment of an adjust bit rate for good buffer level process.

FIG. 16 is a flow diagram illustrating an embodiment of an adjust bit rate for good buffer level process. In some embodiments, the process of FIG. 16 implements, 1502 of FIG. 15 or 1404 of FIG. 14. In the example shown, in 1600, it is determined whether the result of the tenth check is true. In the event it is determined that the result of the tenth check is true, control passes to 1602. In 1602, a check efficiency process is executed with an estimated bitrate as argument, and the process then ends. In the event it is determined in 1600 that the result of the tenth check is not true, control passes to 1604. In 1604, it is determined whether the current keep time is above the argument value. For example, it is determined whether the current keep time is above the argument passed to the adjust bit rate for good buffer level process. In the event it is determined that the current keep time is above the argument value, control passes to 1606. In 1606, a check efficiency process is executed with one increment above the current bitrate as argument, and the process then ends. In the event it is determined in 1604 that the current keep time is not above the argument value, control passes to 1608. In 1608, it is determined that the streaming bitrate comprises the current streaming bitrate, and the process ends.

Figure 17:
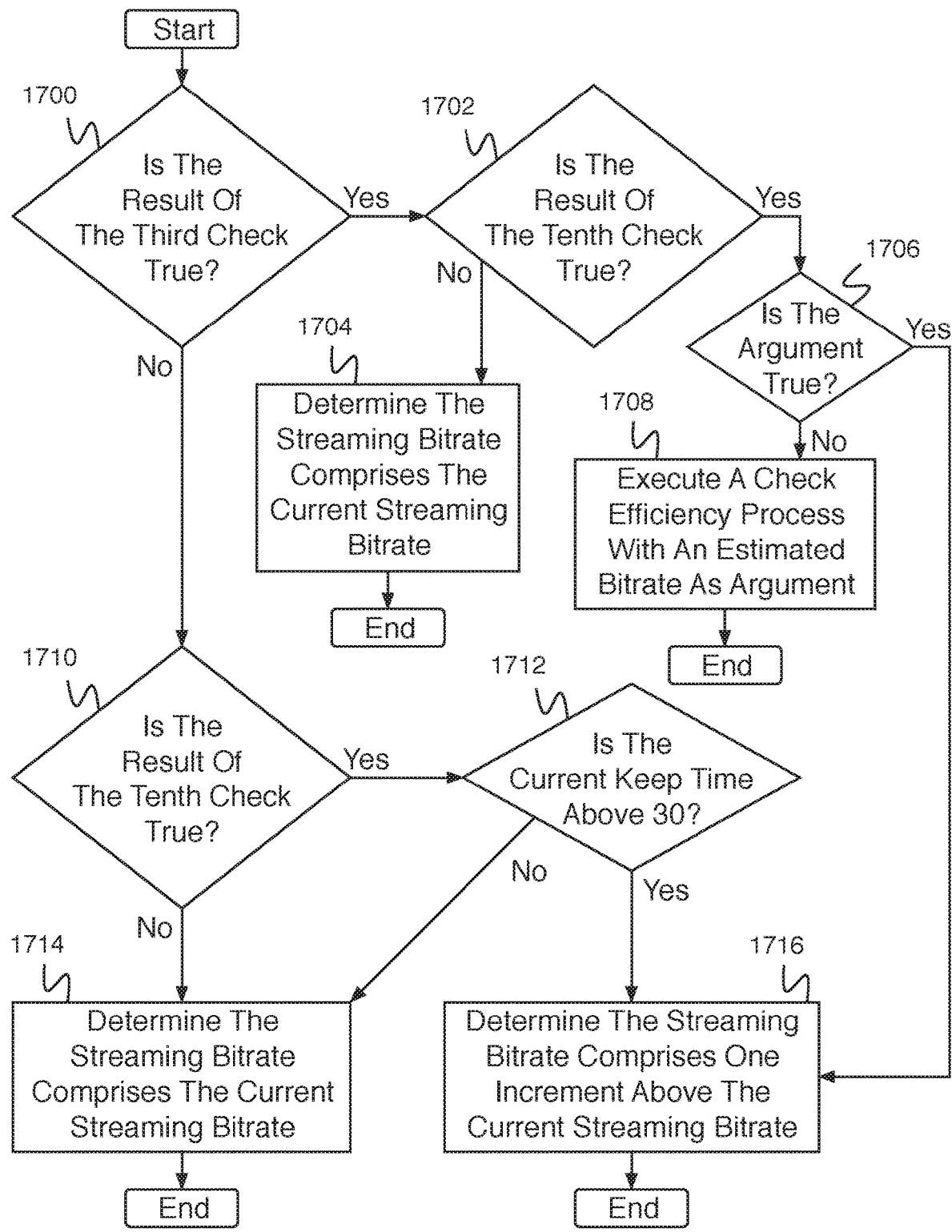
FIG. 17 is a flow diagram illustrating an embodiment of an adjust bit rate for enough buffer level process.

FIG. 17 is a flow diagram illustrating an embodiment of an adjust bit rate for enough buffer level process. In some embodiments, the process of FIG. 17 implements 1408 of FIG. 14 or 1410 of FIG. 14. In the example shown, in 1700, it is determined whether the result of the third check is true. In the event it is determined that the result of the third check is true, control passes to 1702. In 1702, it is determined whether the result of the tenth check is true. In the event it is determined that the result of the tenth check is not true, control passes to 1704. In 1704, it is determined that the streaming bitrate comprises the current streaming bitrate, and the process then ends. In the event it is determined in 1702 that the result of the tenth check is true, control passes to 1706. In 1706, it is determined whether the argument (e.g., the argument passed to the adjust bit rate for enough buffer level process) is true. In the event it is determined that the argument is true, control passes to 1716. In the event it is determined that the argument is not true, control passes to 1708. In 1708, a check efficiency process is executed with an estimated bitrate as argument, and the process then ends. In the event it is determined in 1700 that the result of the third check is not true, control passes to 1710. In 1710, it is determined whether the result of the tenth check is true. In the event it is determined that the result of the tenth check is not true, control passes to 1714. In the event it is determined that the result of the tenth check is true, control passes to 1712. In 1712, it is determined whether the current keep time is above 30. In the event it is determined that the current keep time is not above 30, control passes to 1714. In 1714, it is determined that the streaming bitrate comprises the current streaming bitrate, and the process then ends. In the event it is determined in 1712 that the current keep time is above 30, control passes to 1716. In 1716, it is determined that the streaming bitrate comprises one increment above the current streaming bitrate, and the process ends.

Figure 18:
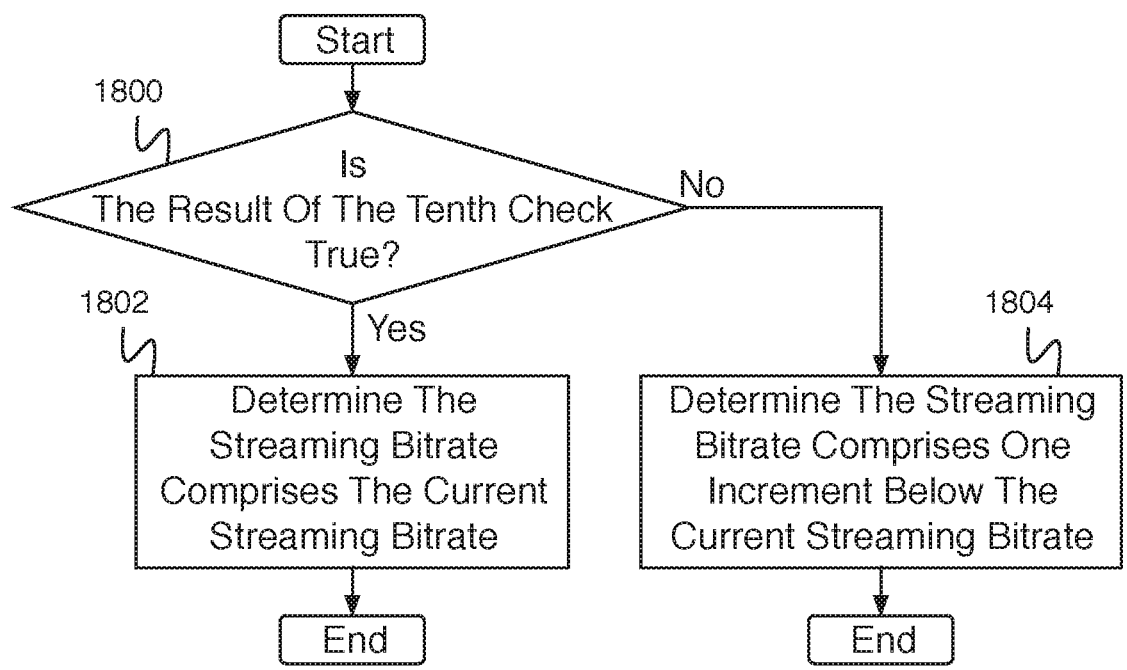
FIG. 18 is a flow diagram illustrating an embodiment of a process for an adjust bit rate for bad buffer level process.

FIG. 18 is a flow diagram illustrating an embodiment of a process for an adjust bit rate for bad buffer level process. In some embodiments, the process of FIG. 18 implements 1508 of FIG. 15. In the example shown, in 1800, it is determined whether the result of the tenth check is true. In the event it is determined that the result of the tenth check is true, control passes to 1802. In 1802, it is determined that the streaming bitrate comprises the current streaming bitrate, and the process then ends. In the event it is determined in 1800 that the result of the tenth check is not true, control passes to 1804. In 1804, it is determined that the streaming bitrate comprises one increment below the current streaming bitrate, and the process ends.

Figure 19:
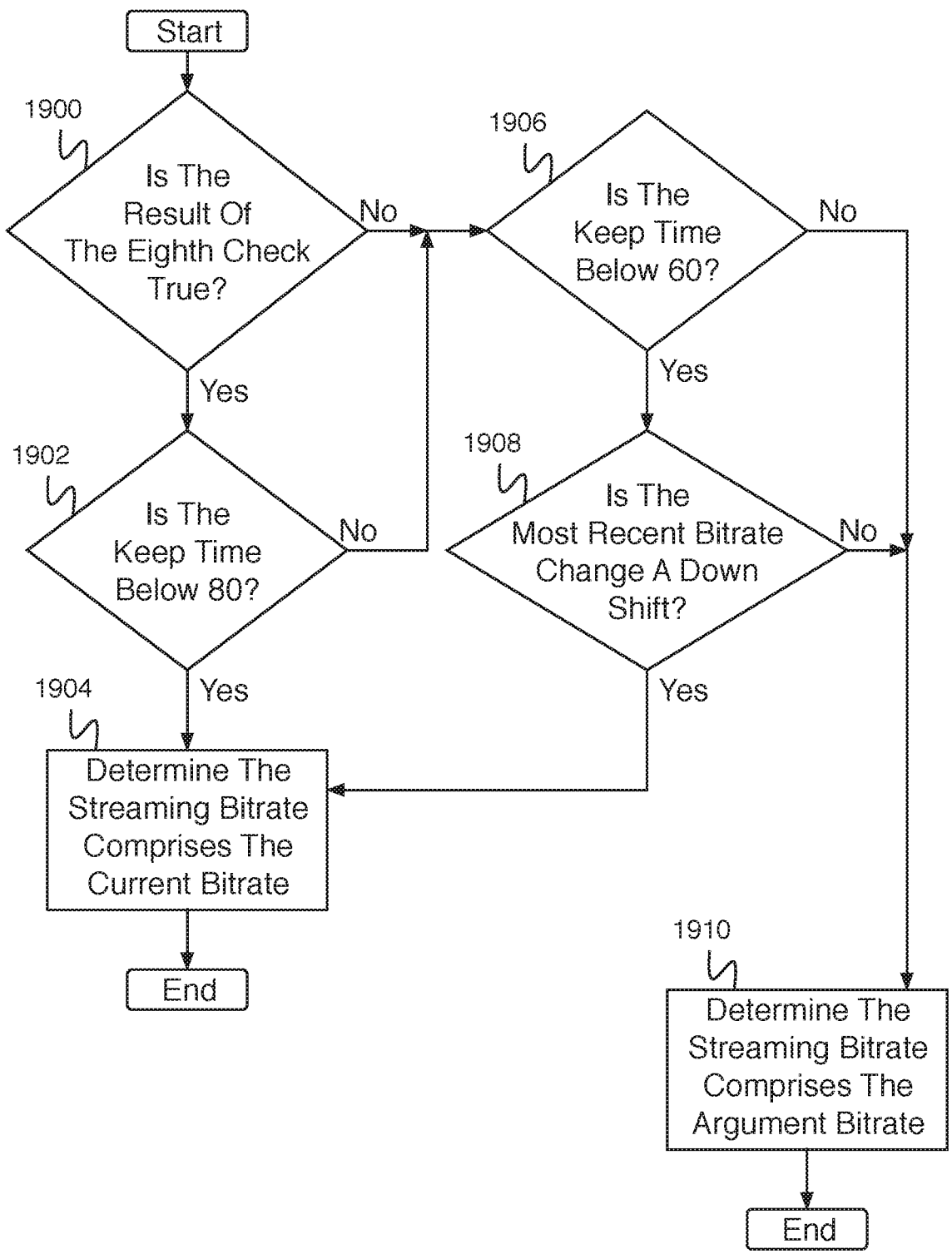
FIG. 19 is a flow diagram illustrating an embodiment of a process for a check efficiency process.

FIG. 19 is a flow diagram illustrating an embodiment of a process for a check efficiency process. In some embodiments, the process of FIG. 19 implements 1602 of FIG. 16, 1606 of FIG. 16, or 1708 of FIG. 17. In the example shown, in 1900, it is determined whether the result of the eighth check is true. In the event it is determined that the result of the eighth check is not true, control passes to 1906. In the event it is determined that the result of the eighth check is true, control passes to 1902. In 1902, it is determined whether the keep time is below 80. In the event it is determined that the keep time is not below 80, control passes to 1906. In some embodiments, in response to determining that the keep time is not below 80 control passes directly to 1910. In the event it is determined that the keep time is below 80, control passes to 1904.

In 1906, it is determined whether the keep time is below 60. In the event it is determined that the keep time is not below 60, control passes to 1910. In the event it is determined that the keep time is below 60, control passes to 1908. In 1908, it is determined whether the most recent bitrate change is a down shift. In the event it is determined that the most recent bit rate change is not a down shift, control passes to 1910. In 1910, it is determined that the streaming bitrate comprises the argument bitrate, and the process ends. In the event it is determined in 1908 that the most recent bitrate change is a down shift, control passes to 1904. In 1904, it is determined that the streaming bitrate comprises the current bitrate, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for bitrate adaptation for low latency streaming comprising:
an interface configured to:
receive statistics from a streaming server, wherein the statistics comprise a current bitrate, a server latency, and a buffer level; and
a processor configured to:
perform a set of checks based at least in part on the server latency and the buffer level;
determine a streaming bitrate based at least in part on the set of checks; and
in response to a determination that the streaming rate is not the same as the current streaming bitrate, indicate the streaming bitrate to the streaming server.

2. The system of claim 1, wherein the server latency comprises a time delay between providing an indication to the streaming server and receiving a response to the indication from the streaming server.

3. The system of claim 1, wherein the buffer level comprises a time duration of buffered video data.

4. The system of claim 1, wherein the streaming bitrate is indicated to the streaming server.

5. The system of claim 1, wherein determining the streaming bitrate comprises determining to set the streaming bitrate to a minimum streaming bitrate.

6. The system of claim 1, wherein determining the streaming bitrate comprises determining to maintain the streaming bitrate at the current streaming bitrate.

7. The system of claim 1, wherein determining the streaming bitrate comprises determining to tune the streaming bitrate based at least in part on the set of checks, wherein tuning the streaming bitrate comprises determining to adjust the streaming bitrate to a higher bitrate or determining to adjust the streaming bitrate to a lower bitrate.

8. The system of claim 7, wherein it is determined to adjust the streaming bitrate to a lower bitrate in response to an efficiency check indicating an inefficient download.

9. The system of claim 7, wherein it is determined to adjust the streaming bitrate to a higher bitrate in response to an efficiency check indicating an efficient download.

10. The system of claim 1, wherein a check of the set of checks comprises a comparison of a first statistic of the statistics with a second statistic of the statistics.

11. The system of claim 1, wherein a check of the set of checks comprises a comparison of a statistic of the statistics with a threshold value.

12. The system of claim 1, wherein the streaming bitrate is determined in response to a logical operation on a result of a first check of the set of checks and a result of a second check of the set of checks.

13. The system of claim 1, wherein a statistic of the statistics comprises one of: a server latency, a live latency, a target latency, a buffer level, an average buffer level, an efficiency, average efficiency, a keep time, an estimated bitrate, a stable buffer time, a segment duration, and a reason for latest bitrate change.

14. The system of claim 1, wherein a first check of the set of checks comprises determining whether the server latency is greater than an average buffer level.

15. The system of claim 1, wherein in response to a first check determined to be true and a second check determined to be true, the streaming bitrate is indicated to be set to the minimum streaming bitrate, wherein the second check of the set of checks comprises determining whether the server latency is greater than the buffer level.

16. The system of claim 1, wherein in response to a first check determined to be true and a second check determined to be false, the streaming bitrate is indicated to be kept constant, wherein the second check of the set of checks comprises determining whether the server latency is greater than the buffer level.

17. The system of claim 1, wherein in response to a first check determined to be false, an eighth check determined to be true, and a third check determined to be false or a fourth check determined to be false, the streaming bitrate is indicated to be lowered one increment at a time until an efficiency is greater than zero, wherein the third check of the set of checks comprises determining whether an average buffer level is greater than a stable buffer time, the fourth check of the set of checks comprises determining whether the buffer level is greater than 95% of an average buffer level or 130% of the stable buffer time, and the eighth check of the set of checks comprises determining whether an efficiency is less than zero.

18. The system of claim 1, wherein in response to a first check determined to be false and a seventh check determined to be false or a ninth check and a fifth check determined to be true, or a sixth check determined to be false, or an eighth check determined to be false, the streaming bitrate is indicated to be tuned upwards, wherein the fifth check of the set of checks comprises determining whether the buffer level is greater than 70% of a stable buffer time, wherein the sixth check of the set of checks comprises determining whether a live latency is greater than a target latency, a stable buffer time, or 250% of a segment duration, wherein the seventh check of the set of checks comprises determining whether a reason for the latest bitrate change comprises bad latency, wherein the eighth check of the set of checks comprises determining whether an efficiency is less than zero, wherein the ninth check of the set of checks comprises determining whether a keep time is greater than a threshold number of seconds.

19. The system of claim 1, wherein the processor is further configured to determine whether the streaming bitrate is the same as the current streaming bitrate.

20. A method for bitrate adaptation for low latency streaming comprising:
- receiving statistics from a streaming server, wherein the statistics comprise a current bitrate, a server latency, and a buffer level;
- performing, using a processor, a set of checks based at least in part on the server latency and the buffer level;
- determining a streaming bitrate based at least in part on the set of checks; and
- in response to a determination that the streaming rate is not the same as the current streaming bitrate, indicating the streaming bitrate to the streaming server.

21. A computer program product for bitrate adaptation for low latency streaming, the computer program product being embodied in a non-transitory computer readable storage medium and comprising computer instructions for:
- receiving statistics from a streaming server, wherein the statistics comprise a current bitrate, a server latency, and a buffer level;
- performing a set of checks based at least in part on the server latency and the buffer level;
- determining a streaming bitrate based at least in part on the set of checks; and
- in response to a determination that the streaming rate is not the same as the current streaming bitrate, indicating the streaming bitrate to the streaming server.

* * * * *